(12) United States Patent
Yan et al.

(10) Patent No.: US 10,120,673 B2
(45) Date of Patent: Nov. 6, 2018

(54) METHOD AND DEVICE FOR REMOTELY UPDATING APPLICATION PROGRAM

(71) Applicant: CHINA UNIONPAY CO., LTD., Shanghai (CN)

(72) Inventors: Xiangxiang Yan, Shanghai (CN); Yu Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 15/037,769

(22) PCT Filed: Nov. 24, 2014

(86) PCT No.: PCT/CN2014/092027
§ 371 (c)(1),
(2) Date: May 19, 2016

(87) PCT Pub. No.: WO2015/078341
PCT Pub. Date: Jun. 4, 2015

(65) Prior Publication Data
US 2016/0306619 A1     Oct. 20, 2016

(30) Foreign Application Priority Data

Nov. 26, 2013   (CN) .......................... 2013 1 0604691

(51) Int. Cl.
*G06F 9/445*    (2018.01)
*G06F 8/65*     (2018.01)
(Continued)

(52) U.S. Cl.
CPC ................ *G06F 8/65* (2013.01); *H04L 47/12* (2013.01); *H04L 67/10* (2013.01); *H04L 67/34* (2013.01)

(58) Field of Classification Search
CPC ....................................................... G06F 9/445
(Continued)

(56) References Cited

U.S. PATENT DOCUMENTS 6,167,567 A * 12/2000 Chiles ....................... G06F 8/65
709/221
2005/0144616 A1   6/2005 Hammond et al.
(Continued)

FOREIGN PATENT DOCUMENTS

CN      101593121 A      12/2009
CN      101917454 A      12/2010
(Continued)

*Primary Examiner* — Chuck O Kendall
(74) *Attorney, Agent, or Firm* — The Ollila Law Group LLC

(57) ABSTRACT

The invention relates to computer technology, and in particular, to a method for achieving remote updating of application programs in a distributed application environment as well as a terminal management system for realizing the method. In a method for achieving remote updating of application programs in an application environment, the application environment comprises a terminal manager, downloading nodes and terminals, wherein the terminals are communicatively coupled with the terminal manager and the downloading nodes via network, and the method comprises the following steps: when the issuing time point of updating data packets of application programs is reached, the terminal manager sends the updating data packets to a plurality of nodes synchronously; in response to an initiation of an interaction process between the terminal manager and one of the plurality of terminals, the terminal manager determines whether the terminal is an object for which a remote updating of application programs is executed; if the terminal is an object for which a remote updating of application programs is executed, the terminal manager designates at least one downloading node for this terminal, and sends an
(Continued)

identifier of the updating data packets and the address of the designated downloading node to this terminal; and when the updating time point of application programs is reached, an application program updating operation is executed on the terminal that has successfully downloaded the updating data packets.

14 Claims, 3 Drawing Sheets

(51) Int. Cl.
      *H04L 12/801*     (2013.01)
      *H04L 29/08*     (2006.01)

(58) Field of Classification Search
      USPC .................................................. 717/168, 178
      See application file for complete search history.

(56) References Cited

U.S. PATENT DOCUMENTS

| | | | |
|---|---|---|---|
| 2013/0091498 A1* | 4/2013 | Arcese | G06F 9/455 717/173 |
| 2014/0215450 A1* | 7/2014 | Salisbury | G06F 8/60 717/170 |

FOREIGN PATENT DOCUMENTS

| | | |
|---|---|---|
| CN | 1020753558 A | 5/2011 |
| EP | 2026223 A2 | 2/2009 |

* cited by examiner

METHOD AND DEVICE FOR REMOTELY UPDATING APPLICATION PROGRAM

FIELD OF THE INVENTION

The invention relates to computer technology, and in particular, to a method for achieving remote updating of application programs in a distributed application environment as well as a terminal management system for realizing the method.

BACKGROUND

In a typical application environment, terminals distributed over a wide geographical range (e.g., payment terminals such as POS machine, etc.) are responsible for achieving localized applications. There terminals are connected to a terminal management system via network. For purpose of facilitating maintenance and management, the terminal management system can have an ability of remotely updating application programs on the terminals. When it is required to update the application programs, the terminal management system instructs these terminals to be connected to downloading nodes of the terminal management system via network so as to download updating data packets.

On many occasions, the update of terminal applications have to be performed at the same time node, which often results in an access to downloading nodes by a large amount of terminals within a short time period, thus causing breakdown of downloading servers due to visits in excess of limits. When the bandwidth of server is small, such a problem is more prominent. While the visits can be shunted by providing image nodes, the problem can be only alleviated and there is no way to address the problem radically, especially when the amount of terminals is enormous.

In view of the above, when remotely updating application programs on a terminal, how to effectively avoid access congestion becomes a problem that needs to be addressed urgently.

SUMMARY OF THE INVENTION

An object of the invention is to provide a method for achieving remote updating of application programs in an application environment, which can effectively avoid congestion of downloading nodes.

In a method for achieving remote updating of application programs in an application environment according to an embodiment of the invention, the application environment comprises a terminal manager, downloading nodes and terminals, wherein the terminals are communicatively coupled with the terminal manager and the downloading nodes via network, and the method comprises the following steps:

when the issuing time point of updating data packets of application programs is reached, the terminal manager sends the updating data packets to a plurality of nodes synchronously;

in response to an initiation of an interaction process between the terminal manager and one of the plurality of terminals, the terminal manager determines whether the terminal is an object for which a remote updating of application programs is executed;

if the terminal is an object for which a remote updating of application programs is executed, the terminal manager designates at least one downloading node for this terminal, and sends an identifier of the updating data packets and the address of the designated downloading node to this terminal; and when the updating time point of application programs is reached, an application program updating operation is executed on the terminal that has successfully downloaded the updating data packets.

Preferably, in the method, before the issuing time point of updating data packets of application programs is reached, the terminal manager receives an updating job request of application programs from the user in advance, wherein the updating job request comprises updating data packets, issuing time point of updating data packets, updating time point of application programs, valid period of updating data packets, a list of terminals for which remote updating operation of application programs is executed, and authorized certificate of application programs.

Preferably, in the above method, the interaction process is initiated regularly by the terminal manager or the terminals.

Preferably, in the above method, the terminal manager designates a downloading node for the terminal based on loads on the downloading nodes.

Preferably, in the above method, at the same time when the terminal manager sends the identifier of the updating data packets and the address of the designated downloading node to the terminal, the terminal manager also sends the updating time point of application programs; and when the updating time point of application programs is reached, the terminal that has successfully downloaded the updating data packets automatically executes the updating operation of application programs.

Preferably, in the above method, after having successfully downloaded the updating data packets, the terminal sends a message confirming that the updating data packets have been successfully downloaded to the terminal manager. More preferably, when the updating time point of application programs is reached, the terminal manager sends a command of executing updating operation of application programs to the terminal that has successfully downloaded the updating data packets.

Another object of the invention is to provide a terminal management system adapted to achieve remote updating of application programs, which can effectively avoid congestion of downloading nodes.

A terminal management system adapted to achieve remote updating of application programs comprises a terminal manager and a plurality of downloading nodes, wherein the terminal manager comprises an application program management and job dispatching module and a communication module communicatively coupled to a plurality of terminals via network, and wherein the application program management and job dispatching module is configured to execute the following operations:

when the issuing time point of updating data packets of application programs is reached, sending the updating data packets synchronously to the plurality of downloading nodes, and in response to an initiation of an interaction process between the communication module and one of the plurality of terminals, designating at least one downloading node for a terminal that is an object for which a remote updating of application programs is executed, and sending an identifier of the updating data packets and the address of the designated downloading node to the terminal via the communication module.

Preferably, in the above terminal management system adapted to achieve remote updating of application programs, before the issuing time point of updating data packets of application programs is reached, the application program management and job dispatching module receives an updating job request of application programs from the user in advance, wherein the updating job request comprises updating data packets, issuing time point of updating data packets, updating time point of application programs, valid period of updating data packets, a list of terminals for which remote updating operation of application programs is executed, and authorized certificate of application programs.

Preferably, in the above terminal management system adapted to achieve remote updating of application programs, the interaction process is initiated regularly by the terminal manager or the terminals.

Preferably, in the above terminal management system adapted to achieve remote updating of application programs, the application program management and job dispatching module designates a downloading node for the terminal based on loads on the downloading nodes.

Preferably, in the above terminal management system adapted to achieve remote updating of application programs, at the same time when the application program management and job dispatching module sends the identifier of the updating data packets and the address of the designated downloading node to the terminal, the application program management and job dispatching module also sends the updating time point of application programs so that when the updating time point of application programs is reached, the terminal that has successfully downloaded the updating data packets automatically executes the updating operation of application programs.

Preferably, in the above terminal management system adapted to achieve remote updating of application programs, the communication module is configured to receive a message confirming that the updating data packets have been successfully downloaded from the terminal. More preferably, when the updating time point of application programs is reached, the application program management and job dispatching module sends a command of executing updating operation of application programs to the terminal that has successfully downloaded the updating data packets.

BRIEF DESCRIPTION OF THE DRAWINGS

The above and other objects and advantages of the invention will become more fully clear from the following detailed description with reference to accompanying drawings.

DETAILED DESCRIPTION OF THE INVENTION

The invention will be explained below by describing specific embodiments with reference to the accompanying drawings. However, it is understood that these specific embodiments are merely illustrative, and do not serve to limit the spirit and scope of protection of the invention.

In the specification, expressions such as "containing" and "including" means that in addition to elements and steps that have been directly and explicitly mentioned in the specification and claims, the technical solution of the invention does not exclude the inclusion of other elements and steps that have not been directly or explicitly mentioned.

Figure 1:
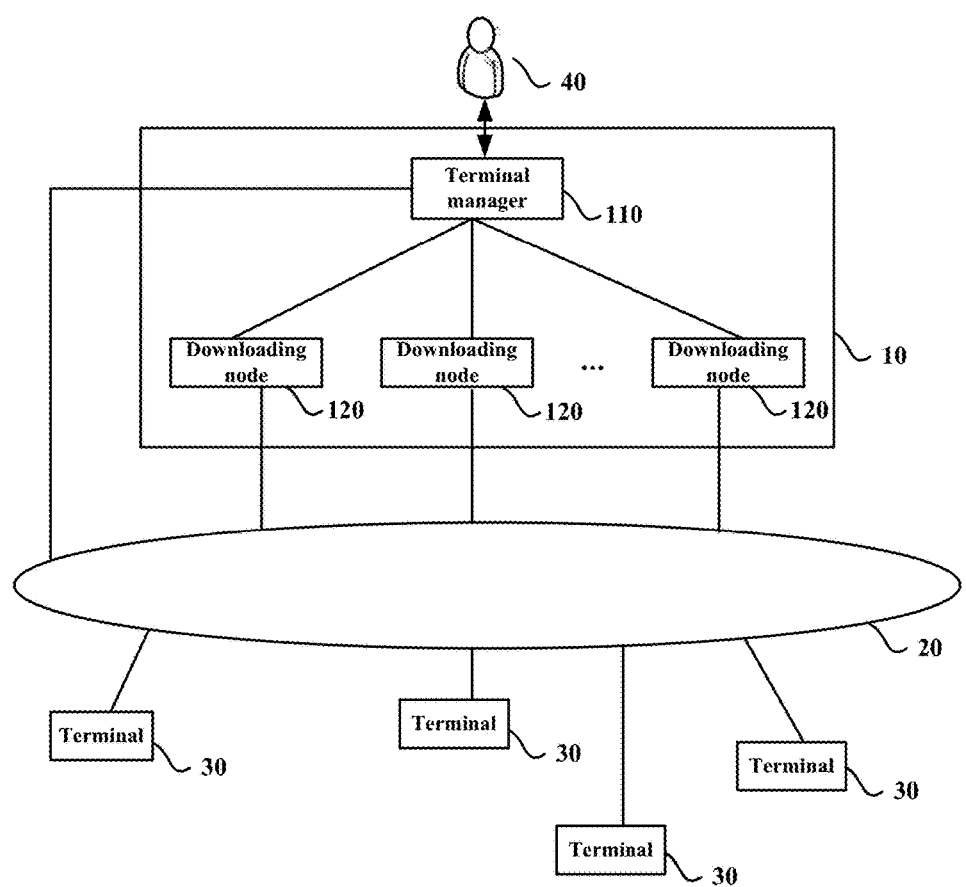
FIG. 1 is a schematic view of terminal management system adapted to achieve remote updating of application programs according to an embodiment of the invention.

FIG. 1 is a schematic view of terminal management system adapted to achieve remote updating of application programs according to an embodiment of the invention. As shown in FIG. 1, the terminal management system 10 adapted to achieve remote updating of application programs according to the present embodiment comprises a terminal manager 110 and a plurality of downloading nodes 120.

Figure 2:
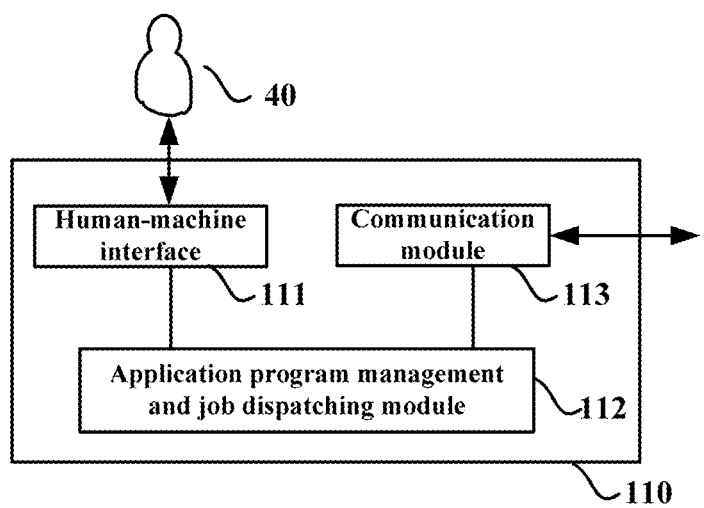
FIG. 2 is a block diagram showing the structure of a terminal manager in the terminal management system shown in FIG. 1.

FIG. 2 is a block diagram showing the structure of a terminal manager in the terminal management system shown in FIG. 1. As shown in FIG. 2, the terminal manager 110 comprises a human-machine interface 111, an application program management and job dispatching module 112, and a communication module 113 adapted to be communicatively coupled to a plurality of terminals 30 via a network 20.

When a system administrator 40 logs onto the terminal manager 110 via the human-machine interface 111, he can upload updating data packets of terminal application programs and set updating operation parameters, thus generating an updating job request of application programs to be provided to the application program management and job dispatching module 112. The updating operation parameters comprise but are not limited to issuing time point of updating data packets, updating time point of application programs, valid period of updating data packets, a list of terminals for which a remote updating of application programs is executed, and authorized certificate of application programs, etc.

The application program management and job dispatching module 112 is responsible for the processing of the generated updating job request. For example, the application program management and job dispatching module 112 will monitor whether the issuing time point of updating data packets is reached; if reached, an updating data packet distributing operation is executed so as to transmit the updating data packets and the authorized certificate of application programs uploaded by the system administrator 40 to individual downloading nodes. It is worth noting that the downloading nodes 120 and the terminal manager can be located identical or non-identical geographical locations.

The communication module 113 is responsible for communication between the terminal manager 110 and the terminals 30. The communication process can be initiated by either party, and can be executed randomly or periodically. Preferably, a so-called "heartbeat interaction" mode can be used to realize the communication between the communication module 113 and the terminals 30. Specifically, one of the communication module 113 and the terminals 30 initiates a communication with the other one at a predetermined time interval; in response to this, the application program management and job dispatching module 112 will firstly determine whether the terminal in communication is an object for which a remote updating of application programs is to be conducted; if the terminal is an object to be updated, one or more of the plurality of downloading nodes 120 is designated as the downloading node for this terminal, and then, the communication module 113 is used to send a downloading task prompt message to this terminal, which message comprises an identifier of the data packet to be updated and the address of the designated downloading nodes. In the present embodiment, the application program management and job dispatching module 112 will designate an appropriate downloading center according to loads on individual downloading centers 120 when the communication module 113 interacts with the terminal 30.

Optionally, the application program management and job dispatching module 112 also sends a message to the designated downloading center via the communication module 113, informing the designated downloading center of the identifier of the terminal which will download updating data packets.

In response of the receipt of the downloading task prompt message, the terminal 30 accesses the designated downloading node so as to download updating data packets of application programs and authorized certificate of application programs, etc. In case there are a plurality of designated downloading nodes, the terminal 30 can select the downloading node which ranks ahead based on the sequence in the list, and accesses a downloading node which ranks immediately behind in the list when the downloading fails.

Preferably, when the terminal 30 has successfully downloaded the updating data packets, it will send a message confirming that the updating data packets have been successfully downloaded when it interacts with the communication module 113 for the next time. Therefore, during the following interactions, the terminal manager 110 will continue to send the downloading task prompt message to the terminals that have failed in downloading.

The application program management and job dispatching module 112 also monitors when the time point for updating data packets is reached; if reached, the communication module 113 sends a command of executing updating operation of application programs to the terminal that has back fed the message confirming that the updating data packets have been successfully downloaded.

Optionally, a parameter of the updating time point of updating data packets can be also added into the downloading task prompt message sent to the terminal. Therefore, when the updating time point of updating data packets is reached, the terminal that is an object to be updated will automatically update application programs thereon.

Through the above way of updating, a uniform switch of executed business can be realized on individual terminals at the same time point, thus facilitating business promotion for users and improvement on marketing effect.

Figure 3:
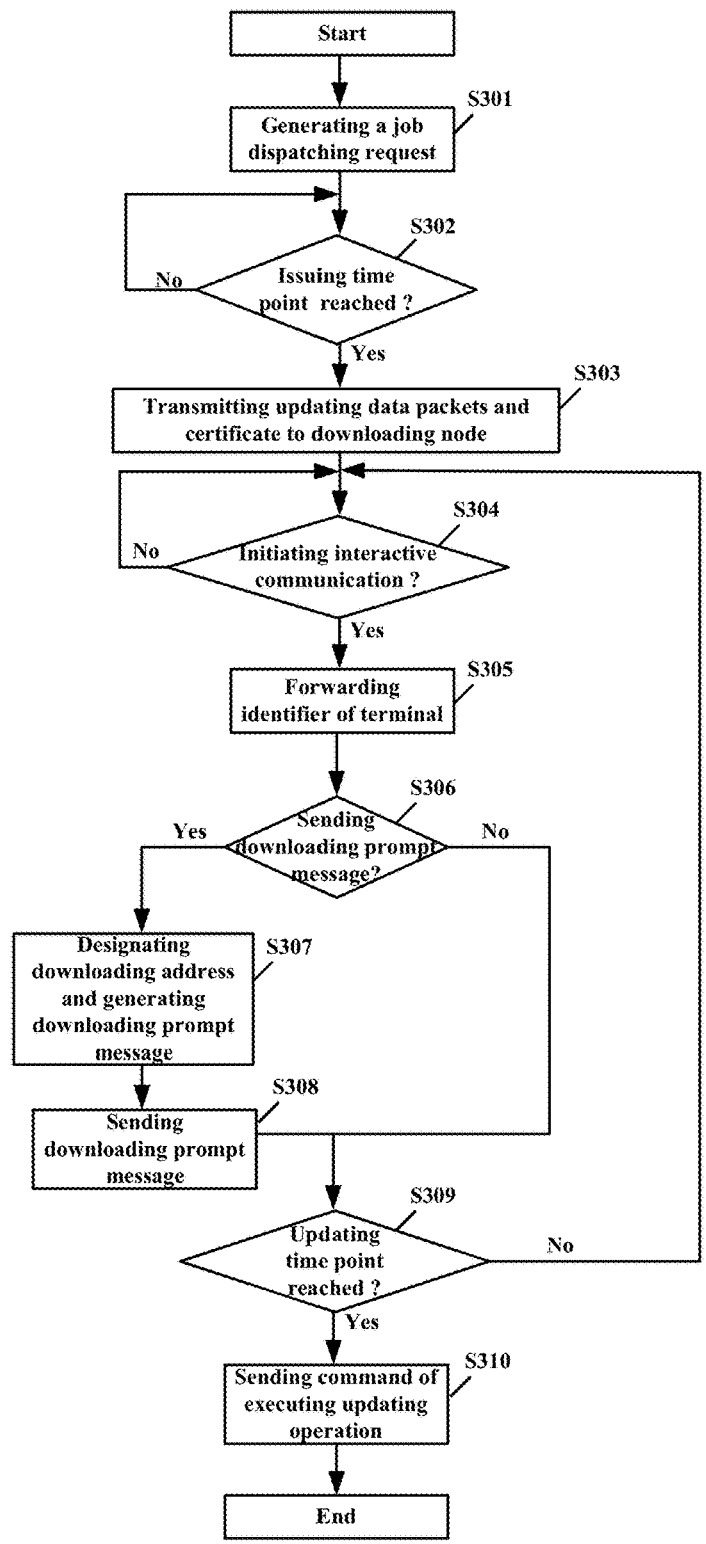
FIG. 3 is a flowchart of a method for achieving remote updating of application programs in an application environment according to another embodiment of the invention.

FIG. 3 is a flowchart of a method for achieving remote updating of application programs in an application environment according to another embodiment of the invention. By way of example, it is assumed herein that the structure of the terminal management system shown in FIGS. 1 and 2 is used. However, it can be understood from the following description that the method of this embodiment does not rely on a particular structure.

As shown in FIG. 3, at step S301, the application program management and job dispatching module 112 in the terminal manager 110 generates an updating job request of application programs according to the updating data packets of terminal application programs uploaded by the system administrator 40 and the configured updating operation parameters. As mentioned above, the updating operation parameters comprise but are not limited to issuing time point of updating data packets, updating time point of application programs, valid period of updating data packets, a list of terminals for which a remote updating of application programs is executed, and authorized certificate of application programs, etc.

Next, at step S302, the application program management and job dispatching module 112 determines whether the issuing time point of updating data packets is reached; if reached, the method proceeds to step S303; otherwise, the monitoring of issuing time points is continued.

At step S303, the application program management and job dispatching module 112 executes an updating data packet distributing operation so as to transmit the updating data packets and authorized certificate of application programs to individual downloading nodes.

After step S303, the method proceeds to step S304, in which it is determined whether an interactive communication is initiated between the communication module 113 and the terminal 30; if initiated, the method proceeds to step S305, in which the communication module 113 sends the identifier of this terminal to the application program management and job dispatching module 112; otherwise, a determination of whether an interactive communication is initiated is continued.

After step S305, the method proceeds to step S306, in which the application program management and job dispatching module 112 determines whether this terminal is in the list of terminals for which a remote updating of application programs is executed according to the received identifier, and whether a message confirming that the updating data packets have been successfully downloaded returned from this terminal is not yet received. If both the conditions are satisfied, the method proceeds to step S307; otherwise, the method proceeds to step S309. As described above, after the terminal has successfully downloaded the updating data packets, it will send a message confirming that the updating data packets have been successfully downloaded to the application program management and job dispatching module 112. Therefore, at this step, the application program management and job dispatching module 112 can determine whether the terminal which is an object to be updated has successfully downloaded the updating data packets.

At step S307, the application program management and job dispatching module 112 designates one or more downloading nodes according to loads on individual downloading centers 120 for the terminal that is currently in communication, and packages the address of the designated downloading node along with the identifier of the data packets to be updated into the downloading task prompt message.

Next, the method proceeds to step S308, in which the application program management and job dispatching module 112 sends a downloading task prompt message generated at step S307 to the terminal that is in communication, via the communication module 113. Optionally, at this step, the application program management and job dispatching module 112 can also send a message to the designated downloading center via the communication module 113, informing the designated downloading center of the identifier of the terminal which will download updating data packets.

After step S308, the method proceeds to step S309, in which the application program management and job dispatching module 112 determines whether the updating time point of updating data packets is reached; if reached, the method proceeds to step S310, in which a command of executing updating operation of application programs is sent to the terminal that has successfully downloaded the updating data packets; otherwise, the method returns to step S304.

Optionally, at step S307, in addition to the address of downloading node and the identifier of updating data packets, the generated downloading task prompt message further comprises a parameter of the updating time point of updating data packets. Therefore, steps S309 and S310 can be omitted, and when the updating time point of updating data packets is reached, the terminal that is an object to be updated will automatically update application programs thereon.

The embodiments of the invention have the following advantages:

Firstly, due to the introduction of a plurality of downloading nodes, when the downloading nodes are distributed at different physical locations, the downloading speed of updating data packets can be increased.

Secondly, through a combination of random downloading and uniform updating, the business can be reliably switched on line while alleviating congestion pressure of downloading nodes.

The invention can be carried out in various ways without departing from the essential spirit of the invention. Therefore, the above described specific embodiments are merely illustrative rather than limiting. The scope of the invention is defined by the appended claims. Various changes or modifications made to the above described embodiments all fall within the scope of protection defined by the appended claims.

The invention claimed is:

1. A method for achieving remote updating of application programs in an application environment, the application environment comprising a terminal manager, downloading nodes and terminals, wherein the terminals are communicatively coupled with the terminal manager and the downloading nodes via network, characterized in that the method comprises the following steps:

when an issuing time point of updating data packets of application programs is reached, the terminal manager sends the updating data packets to a plurality of nodes synchronously;

in response to an initiation of an interaction process between the terminal manager and one of the plurality of terminals, the terminal manager determines whether the terminal is an object for which a remote updating of application programs is executed;

if the terminal is an object for which a remote updating of application programs is executed, the terminal manager designates at least one downloading node for this terminal, and sends an identifier of the updating data packets and the address of the designated downloading node to this terminal; and when an updating time point of application programs is reached, an application program updating operation is executed on the terminal that has successfully downloaded the updating data packets;

wherein the updating time point is predetermined as one to have the application program initiated at some time point substantially after the issuing time point and after downloading the updating packets, wherein either the terminal manager or the terminals initiates a communication with the other one at a predetermined time interval, as a response, the terminal manager firstly determine whether the terminal in communication is an object for which a remote updating of application programs is to be conducted, and if the terminal is an object to be updated, one or more of the plurality of downloading nodes is designated as the downloading node for this terminal.

2. The method according to claim 1, wherein before the issuing time point of updating data packets of application programs is reached, the terminal manager receives an updating job request of application programs from the user in advance, wherein the updating job request comprises updating data packets, issuing time point of updating data packets, updating time point of application programs, valid period of updating data packets, a list of terminals for which remote updating operation of application programs is executed, and authorized certificate of application programs.

3. The method according to claim 1, wherein the interaction process is initiated regularly by the terminal manager or the terminals.

4. The method according to claim 1, wherein the terminal manager designates a downloading node for the terminal based on loads on the downloading nodes.

5. The method according to claim 1, wherein at the same time when the terminal manager sends the identifier of the updating data packets and the address of the designated downloading node to the terminal, the terminal manager also sends the updating time point of application programs; and when the updating time point of application programs is reached, the terminal that has successfully downloaded the updating data packets automatically executes the updating operation of application programs.

6. The method according to claim 1, wherein after having successfully downloaded the updating data packets, the terminal sends a message confirming that the updating data packets have been successfully downloaded to the terminal manager.

7. The method according to claim 6, wherein when the updating time point of application programs is reached, the terminal manager sends a command of executing updating operation of application programs to the terminal that has successfully downloaded the updating data packets.

8. A terminal management system adapted to achieve remote updating of application programs, comprising a terminal manager and a plurality of downloading nodes, characterized in that the terminal manager comprises an application program management and job dispatching module and a communication module communicatively coupled to a plurality of terminals via network, and wherein the application program management and job dispatching module is configured to execute the following operations:

when an issuing time point of updating data packets of application programs is reached, sending the updating data packets synchronously to the plurality of downloading nodes; and in response to an initiation of an interaction process between the communication module and one of the plurality of terminals, designating at least one downloading node for a terminal that is an object for which a remote updating of application programs is executed, and sending an identifier of the updating data packets and the address of the designated downloading node to the terminal via the communication module;

wherein an updating time point is predetermined as one to have the application program initiated at some time point substantially after the issuing time point and after downloading the updating packets, wherein either the terminal manager or the terminals initiates a communication with the other one at a predetermined time interval, as a response, the terminal manager firstly determine whether the terminal in communication is an object for which a remote updating of application programs is to be conducted, and if the terminal is an object to be updated, one or more of the plurality of downloading nodes is designated as the downloading node for this terminal.

9. The terminal management system adapted to achieve remote updating of application programs according to claim 8, wherein before the issuing time point of updating data packets of application programs is reached, the application program management and job dispatching module receives an updating job request of application programs from the user in advance, wherein the updating job request comprises updating data packets, issuing time point of updating data packets, updating time point of application programs, valid period of updating data packets, a list of terminals for which remote updating operation of application programs is executed, and authorized certificate of application programs.

10. The terminal management system adapted to achieve remote updating of application programs according to claim 8, wherein the interaction process is initiated regularly by the terminal manager or the terminals.

11. The terminal management system adapted to achieve remote updating of application programs according to claim 8, wherein the application program management and job dispatching module designates a downloading node for the terminal based on loads on the downloading nodes.

12. The terminal management system adapted to achieve remote updating of application programs according to claim 8, wherein at the same time when the application program management and job dispatching module sends the identifier of the updating data packets and the address of the designated downloading node to the terminal, the application program management and job dispatching module also sends the updating time point of application programs so that when the updating time point of application programs is reached, the terminal that has successfully downloaded the updating data packets automatically executes the updating operation of application programs.

13. The terminal management system adapted to achieve remote updating of application programs according to claim 8, wherein the communication module is configured to receive a message confirming that the updating data packets have been successfully downloaded from the terminal.

14. The terminal management system adapted to achieve remote updating of application programs according to claim 13, wherein when the updating time point of application programs is reached, the application program management and job dispatching module sends a command of executing updating operation of application programs to the terminal that has successfully downloaded the updating data packets.

* * * * *